(12) United States Patent
Van Eaton et al.

(10) Patent No.: US 7,366,976 B2
(45) Date of Patent: *Apr. 29, 2008

(54) METHODS AND SYSTEMS FOR GENERATING A VIEWABLE DOCUMENT USING VIEW DESCRIPTORS AND GENERIC VIEW STYLESHEETS

(75) Inventors: James R. Van Eaton, Bothell, WA (US); Robert R. Gering, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 15 days.

This patent is subject to a terminal disclaimer.

(21) Appl. No.: 11/166,710

(22) Filed: Jun. 24, 2005

(65) Prior Publication Data

US 2005/0262126 A1 Nov. 24, 2005

Related U.S. Application Data

(63) Continuation of application No. 09/819,566, filed on Mar. 27, 2001, now Pat. No. 6,948,117.

(60) Provisional application No. 60/238,107, filed on Oct. 4, 2000.

(51) Int. Cl.
*G06F 17/00* (2006.01)

(52) U.S. Cl. .................... 715/501.1; 715/513

(58) Field of Classification Search ............... 715/513, 715/517, 501.1; 707/10
See application file for complete search history.

(56) References Cited

U.S. PATENT DOCUMENTS

| | | | |
|---|---|---|---|
| 6,587,855 B1 * | 7/2003 | Ellmann et al. ............... 707/10 |
| 6,589,291 B1 * | 7/2003 | Boag et al. .................. 715/513 |
| 6,799,299 B1 * | 9/2004 | Li et al. ...................... 715/513 |
| 6,806,890 B2 * | 10/2004 | Audleman et al. ........... 715/762 |
| 6,907,564 B1 * | 6/2005 | Burchhardt et al. ......... 715/513 |
| 2002/0120684 A1 * | 8/2002 | Christfort et al. ............ 709/203 |

OTHER PUBLICATIONS

Bompani, Juca, et al, "Software Engineering and the Internet", Proceedings of the Conference on The Future of Software Engineering, May 2000, pp. 303-315.*

Usdin, Tommie, et al, "XML: Not a Silver Bullet, But a Great Pipe Wrench", StandardView, vol. 6, Issue 3, Sep. 1998, pp. 125-132.*

* cited by examiner

*Primary Examiner*—William L. Bashore
*Assistant Examiner*—Laurie Ries
(74) *Attorney, Agent, or Firm*—Workman Nydegger

(57) ABSTRACT

Methods, systems, and computer program products, for using a web browser to view stored data over the World Wide Web, where the data is stored in a format normally incompatible with such viewing. A client computer processes a view descriptor and a general view class to generate a specific view class, or template, and a query. The specific view class is used as a template to display data the client receives from a data server after submitting the generated query to the data server. The result of using a specific view class as a template for the data is that the data is output in Hypertext Markup Language, so as to be easily displayable on a web browser. View classes and view descriptors may be developed using existing Web development tools such as Extensible Style Language and Extensible Markup Language.

20 Claims, 3 Drawing Sheets

METHODS AND SYSTEMS FOR GENERATING A VIEWABLE DOCUMENT USING VIEW DESCRIPTORS AND GENERIC VIEW STYLESHEETS

CROSS-REFERENCE TO RELATED APPLICATIONS

This application is a continuation of U.S. patent application Ser. No. 09/819,566, entitled METHODS AND SYSTEMS FOR GENERATING A VIEWABLE DOCUMENT USING VIEW DESCRIPTIONS AND GENERIC VIEW STYLESHEETS, filed Mar. 27, 2001, which claims priority to U.S. Provisional Application Ser. No. 60/238,107, entitled, EXCHANGE 2000 VIEW COMPONENT and filed Oct. 4, 2000. The present application claims the benefit of and priority to each of the forgoing applications, which are incorporated herein by reference in their entirety.

BACKGROUND OF THE INVENTION

1. The Field of the Invention

The present invention relates to displaying stored data using a web browser. More specifically, the present invention relates to using conventional web browser technology to view stored data over the World Wide Web, where the data is not stored in a format normally compatible with such viewing.

2. Background and Related Art

The popularity of the Internet has profoundly improved the way people communicate by allowing users quick and easy access to information. By accessing the World Wide Web and electronic mail through computers and other devices, people now stay in touch with each other around the globe, and can access information on a virtually limitless variety of subjects.

With the ever-increasing use of the World Wide Web, there is a need to efficiently display data stored in a variety of differing formats using a web interface such as a web browser. This includes simultaneously displaying data where the data is stored in formats that are not natively compatible with display using a web browser.

Current methods for displaying non-web data in a web format use data collection products, such as Active-X®. While such products are capable of displaying a variety of data formats, the products require the client to download control modules from sources other than where the data is stored and to have the client process the control modules before any data may be accessed. This downloading places additional traffic on networks, such as the Internet, which consumes network bandwidth. Additionally, this results in consumption of the resources of systems that use such data collection, where these resources may be used for other operations.

Another method for accessing such data would be to write a separate application program or style sheet for each view of each different type of data. However, this would result in large quantities of application programs or style sheets, which would require extensive development time and would be burdensome to manage. Additionally, when new data formats are created, new style sheets would have to be developed to access the data.

Accordingly, what are desired are systems, methods, and computer program products that facilitate more efficient Web access to data that is not natively compatible with a Web browser, and where changes to the layout on the Web browser are more easily realized without extensive recoding.

SUMMARY OF THE INVENTION

The present invention relates to systems, methods, and computer program products for efficiently viewing data on a web browser where the data is not natively compatible for viewing on web browsers. The viewing is performed using existing browser technologies.

The present invention uses a view control and a view descriptor to perform a series of data transformations. The transformations employ existing coding languages such as Hypertext Markup Language (HTML), Extensible Markup Language (XML) and Extensible Style Language (XSL). By using these data transformations, it is possible to view a particular set of data on a Web browser where normally the set of data would not be viewable.

The view control may typically be used in a network environment such as a LAN, WAN or on the Internet. These environments include multiple interconnected computer systems, which may typically need to access stored data. In an Internet environment, it may also be that a number of computer systems are employing Web browsers to access data stored on network servers or data servers, across the World Wide Web. A user may have access to a computer system including a Web browser, but the computer system does not include programs needed to display data from proprietary e-mail or other databases and this data is not natively displayable using a Web browser. In this case, the computer including the Web browser is associated with the view control. The view control may be stored locally on the client or may be received from the location where the data resides, such as servers on a network.

For instance, if a user wanted to display the contents of an electronic mailbox stored using a proprietary format, the view control would access a view descriptor associated with the mailbox format. The view descriptor would identify stored data and include parameters on how the identified data should be arranged when viewed on the Web browser. The parameters may include such things as where to display columns such as the "TO" or "FROM" fields when viewing the e-mail data stored in the mailbox. The view descriptor is in the form of an XML document and may be stored in the same location as the data that will be accessed. The view control may access the view descriptor using any method where one computer on a network accesses data from another computer on the network, such as downloading over a dial-up or permanent network connection.

After the view control receives the view descriptor, the view control processes the view descriptor. This may involve accessing a generic style sheet as well as generating a query that the view control will submit to a data server. The generic style sheet includes generic information on how the data will be displayed and may be in XSL. The query, which takes the form of an SQL query, requests the data that will be displayed. In the electronic mailbox example, the query might ask for all the electronic mails received on a certain date. Additionally, parameters included in the view control are combined with the generic XSL style sheet to generate another XSL style sheet that is specific to the data that will be accessed.

The view control then accesses the identified data on a data server by submitting the generated query to the data server. The client receives the data returned from the query for further processing by the view control. The returned data may be in a variety of data formats, including XML.

After the data is received, the view control processes the data to make it viewable on a web browser. This involves using the XSL style sheet that was generated specifically for the data, to transform the data into a HTML document. In the instance where the data is a XML document, the XML document is transformed into an HTML document by the view control executing the XSL document. The HTML document is then output to the web browser.

The present invention is advantageous for at least two reasons. First, through the use of generic style sheets, a wide variety of display layouts can be achieved on a web browser using the same style sheet. This reduces the programming resources that are need to created views for new display layouts. Second, the view descriptor and view control may be embedded in the same HTML page. When the view descriptor and view control are embedded in the same HTML page they may be accessed with one request, thus saving an extra request to the server. This reduces the network bandwidth requirements needed to display data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which is illustrated, in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to methods, systems, and computer program products for rendering data for display using a Web browser. A view control is associated with a client computer that includes a web browser. The view control accesses a view descriptor that includes reference to a specified set of data the view control will access from a data server, and that includes parameters on how to format the accessed data.

In operation, the view control additionally accesses a generic view class. The generic view class and view descriptor are processed by the view control in order to generate a specific view class, or template, that is used to convert accessed data into a viewable format. The view descriptor, generic view class and specific view class, employ existing coding languages such as Hypertext Markup Language (HTML), Extensible Markup Language (XML) and Extensible Style Language (XSL). By generating a specific view class for data, it is possible to view the data on a Web browser where normally the data would not be viewable. In addition, changes to the display format may be made by changing data in the view descriptor, rather than having to directly manipulate the template.

The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media, which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
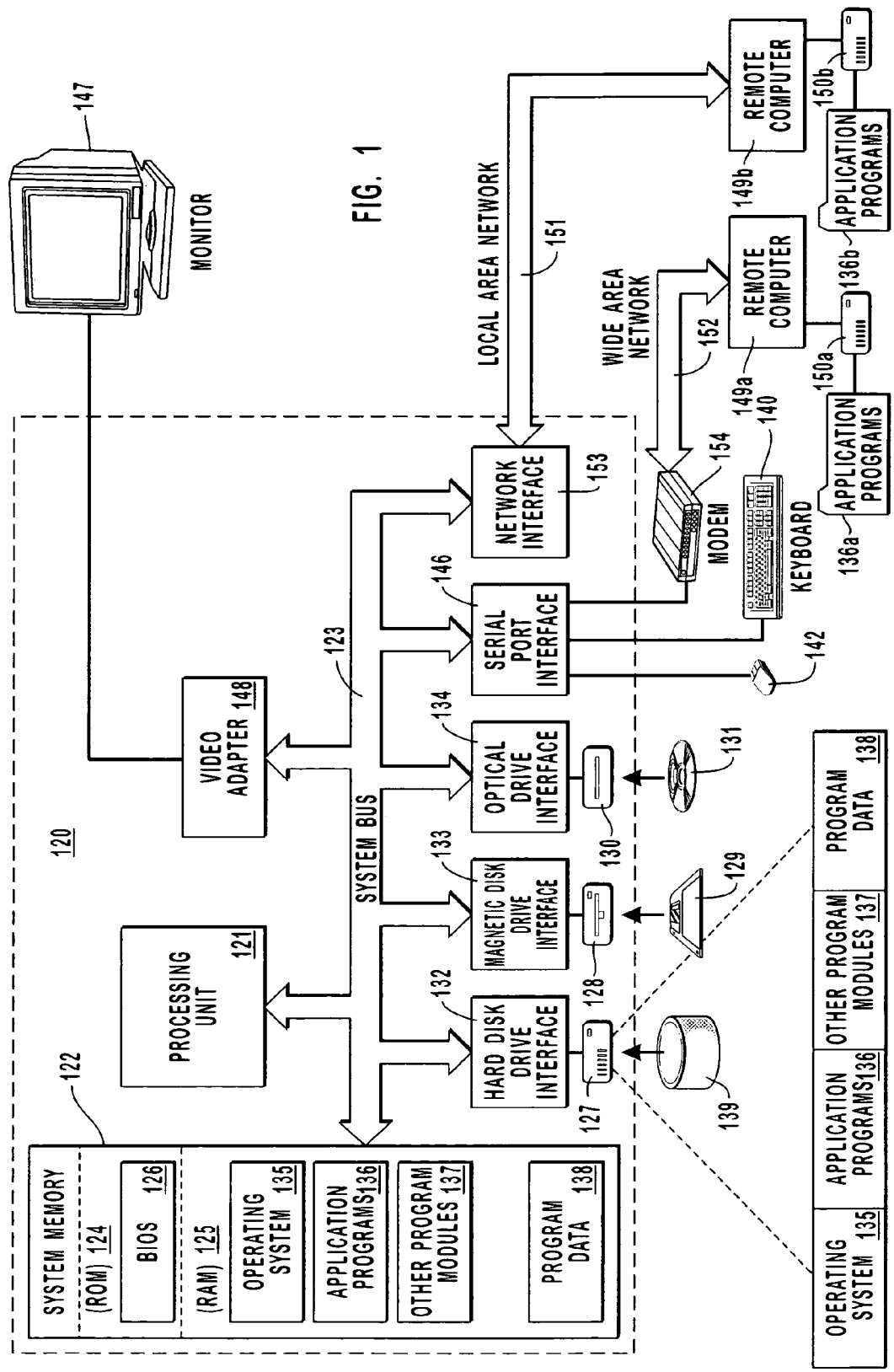
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. The sequence of instructions implemented in a particular data structure or program module represents examples of corresponding acts for implementing the functions or steps described herein.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general-purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

In this description and in the following claims, the term "computer" should be interpreted broadly to encompass a general purpose or special purpose computer or any other computing device including, but not limited to, various computer hardware components, such as those illustrated in FIG. 1. A "computer system" includes a group of one or more computers that interact cooperatively to perform one or more functions. A "network system" includes a plurality of interconnected computer systems, as well as other devices that may be connected to computer systems. A "client system" or "client" is a computer system that uses the services of another computer system. In contrast, a "server system" or "server" is a computer system that provides services to another computer system.

Note that a computer system may use the services of another computer system and yet still provide services to other computer systems. Thus, a client system in one context may also be a server system in another context. Similarly, a server system in one context may also be a client system in another context.

Reference is also be made to a "network server" or "data server." These types of servers fit inside the "client system"/"server system" dichotomy as described above and may provide services to other computers and/or use services of other computers simultaneously.

In this description and in the following claims the term HyperText Markup Language, or HTML, refers to the authoring language used to create documents on the World Wide Web. HTML defines the structure and layout of a Web document by using a variety of tags and attributes. HTML is typically used to create documents that will be displayed on devices, such as a computer system, using a web browser.

The term, Extensible Markup Language, or XML, refers to an authoring language, which allows designers to create their own customized tags, enabling the definition, transmission, validation, and interpretation of data between applications and between organizations.

The term, Extensible Style Language, or XSL, refers to a specification for separating style from content when creating HTML or XML pages. The specifications work much like templates, allowing designers to apply single style documents to multiple pages. XSL allows developers to dictate the way Web pages are rendered and to transfer XML documents across different applications.

The term "displayable content" refers to content, which when received and output by a web browser such as MICROSOFT® Internet Explorer or NETSCAPE NAVIGATOR®, has meaning to a human being. Displayable content primarily includes, but is not limited to, visual text or images or audio sounds, which when output have meaning to a human being. Displayable content may take the form of an HTML document.

While FIG. 1 and the corresponding discussion above provide a general description of a suitable environment in which the invention may be implemented, it will be appreciated that the features of the present invention may be practiced in association with a variety of configurations. Therefore, the components illustrated in FIG. 1 provide only one exemplary environment for practicing the present invention.

Figure 2:
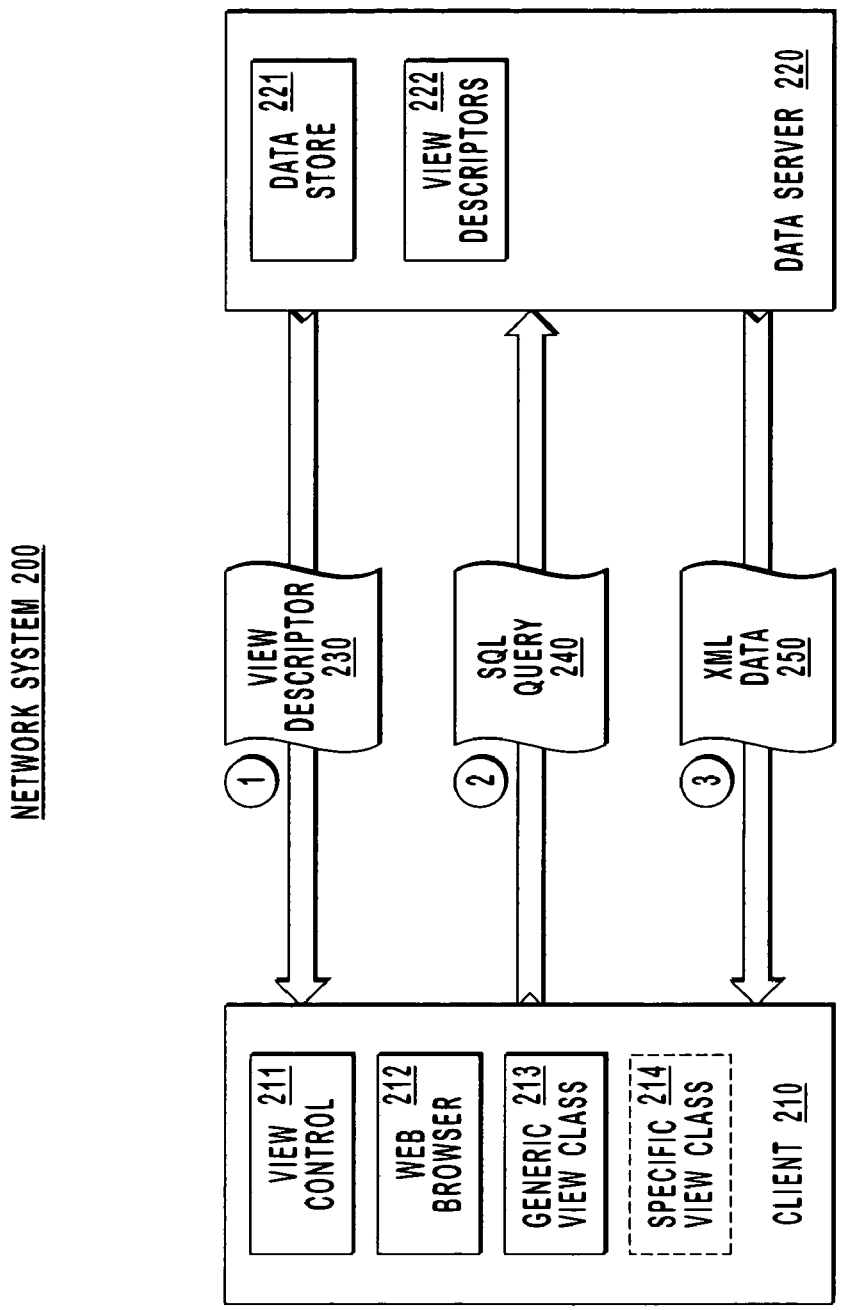
FIG. 2 illustrates some of the functional components present in a network system where data from a data server is displayed to a client that includes a web browser.

FIG. 2 illustrates a network system 200 suitable for implementing the principles of the present invention. The network system 200 includes client 210 and data server 220. Client 210 includes view control 211, web browser 212, and generic view class 213. Data server 220 includes data store 221 and view descriptors 222. Although not required, both client 210 and data server 220 may be structured as described above for computer 120. The components of the network system 200 mentioned above work together to implement the principles of the present invention.

Figure 3:
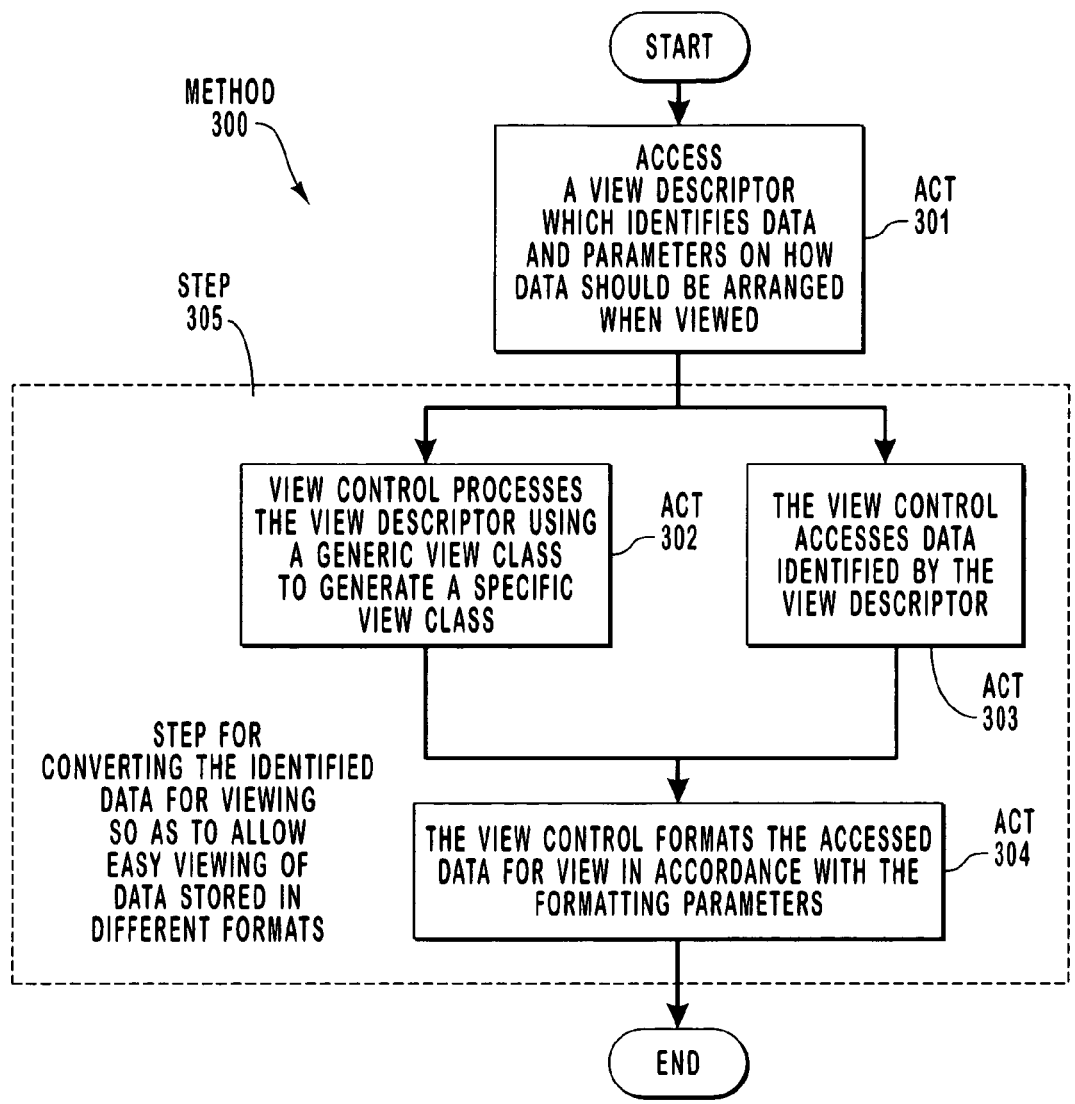
FIG. 3 is a flow diagram illustrating a method whereby data from a data server is displayed to a client that includes a web browser.

FIG. 3 illustrates a method 300 for client 210 to retrieve data stored on data server 220 and display such data on a web browser, such as web browser 212. The method of FIG. 3 will be described in the context of the network system illustrated in FIG. 2. Thus, elements of both FIGS. 2 and 3 will be referred to frequently in describing the operation of the present invention. The functionality of each of the components of FIG. 2 will become clear from the following description relating to both FIG. 2 and FIG. 3.

In operation, client 210 accesses one of the view descriptors 222, namely view descriptor 230 (act 301). This is illustrated in FIG. 2 by arrow 1, where client 210 receives view descriptor 230. View descriptor 230 identifies data stored on data server 220 that is to be included in the view, as well as formatting parameters on how the data should be arranged when viewed on a web browser. Such formatting parameters may include, for example, column descriptions, data properties and appearance. The view descriptor may be in any format that may be passed to and interpreted by client 210, including the XML format.

View descriptor 230 may be sent to client 210 in response to a request generated from client 210. This request may come from an application program included on client 210, such as web browser 212. However, the request may also come from any other application program included in client 210 such as those discussed in reference to application programs 136. It may also be that an application program running internally on data server 220 generated the request or that another device included on network system 200 generated the request.

Network system 200 may be any network that allows communication between one or more of the functional components shown in FIG. 1, including the Internet. Client 210 and data server 220 may be associated with network system 200 using any of the components included in FIG. 1.

As an application example, suppose the user of client 210 is traveling with client 210, but desires to view her electronic mail in-box to keep up-to-date. The user would then use the interface of the web browser 212 to indicate such a desire. In response, the web browser 212 would generate a request for the in-box content and use the operating system to transmit the request to data server 220. The data server 220 may include view descriptor 230 in the response to client 210.

Note that client 210 and data server 220 are illustrated in FIG. 2 and described in the application example as being two physically separate computer systems. However, client 210 and data server 220 may also be integrated so that the request need not be transmitted using network messaging. In this instance, web browser 212 may pass the request to the data server 220 as a call through an Application Program Interface (API).

Even if the client 210 and data server 220 were physically separate, some of the functionality described herein as attributed on the data server 220 may instead be performed directly by the client 210. For example, the client 210 may locally access the view descriptor 230, while the data store 221 is still remotely hosted by the separate data server 220. Thus, the client 210 may have cached view descriptors received previously from the data server 220 or else the client 210 may simply store a suite of standard view descriptors. However, having the view descriptors stored in a centralized location, such as at data server 220, rather than on each individual client machine allows for changes in the view descriptor to be more easily made at the centralized location and propagated out to individual clients as needed.

After client 210 accesses view descriptor 230 (act 301), client 220 performs a step for converting the data identified by view descriptor 230 for viewing so as to allow easy viewing of data stored in different formats (step 305). In one embodiment, step 305 may first include an act of client 210 processing view descriptor 230 together with a generic view class, such as generic view class 213 (act 302). Similar to a view descriptor, a generic view class includes data formatting and layout parameters. However, the information included in a generic view class is applicable to a wide variety of different display layouts. Thus, a generic view class, once developed may be applied to different display layouts without extensive recoding. A generic view class 213 may be developed using any number of programming languages, including XSL.

During processing, view control 211 includes portions of both view descriptor 230, which includes information on how the specific set of data should be viewed, and generic view class 213, which includes general data formatting parameters, to generate a specific view class 214 for a specific set of data identified in the view descriptor 230. The resultant specific view class 214 is then used as a template for the display of the corresponding identified data that is later received from data server 220. The specific view class 214, since it uses information from the view descriptor 230, is tailored to displaying the data referenced by the view descriptor 230.

As the view control generates a specific view class (act 302), the view control 211 processes view descriptor 230 to generate a query that identifies the set of data that was associated with view descriptor 230. The generated query may be in any format understandable by data server 220, including SQL.

Referring once again to the application example, client 210 may receive view descriptor 230 that includes information on the contents of client 210's electronic mail in-box. In this instance, view control 211 would process view descriptor 230 and a generic view class associated with electronic main in-boxes in order to generate a specific view class for the electronic mail in-box contents. In parallel, view control 211 would also generate a query for the contents of the electronic mail in-box that may later be submitted to data server 220.

In addition to view control 211 processing the view descriptor (act 302), step 305 includes an act of the view control accessing data from data store 211 (act 303). The data may be accessed from the data server 220 optionally in parallel with the generation of the specific view class. The act of accessing the data identified by the view descriptor (act 303) may include submitting a previously generated query to data server 220. As shown in FIG. 2, by arrow 2, client 210 sends SQL query 240 to data server 220. If client 210 and data server 220 were integrated, as discussed above, client 210 may pass SQL query 240, or any other type of query, as a call through an Application Program Interface (API).

In response to SQL query 240, data server 220 sends the data identified in the view descriptor to the client 210. Data store 221 may include data stored in a wide variety of formats. As a result, any queries submitted to data server 220 may return data in a variety of formats as well. However, in one embodiment, the data server 220 consistently returns data in accordance with the XML format. For example, shown in FIG. 2, by arrow 3, is an example of data server 220 sending XML data 250 to client 210. In the previously referenced application example, this would include data server 220 sending the contents of the electronic mail in-box to client 210. It should be noted, that in addition to submitting a query, the invention may be practiced with a wide variety of other data access methods that are well known in the art.

After accessing data from data store 221 (act 303), step 305 may then include an act of view control 211 formatting the accessed data, such as XML data 250 (act 304). One example of this formatting is using a previously generated specific view class 214 to format the data for viewing on a web browser, such as web browser 212. A specific view class 214 includes specific information about the accessed data, which was included in the view descriptor 230. Thus, since view descriptor 230 included information about XML data 250, formatting the data for web browser viewing is more easily realized. Formatting data for display on a web browser, such as web browser 212, may include converting XML data 250 into HTML directives. However, web browsers are capable of displaying a variety of data formats and it may be the case that formatting the accessed data results in displayable formats other than HTML. After the data is formatted it may be sent to web browser 212.

Referring once again to the application example, view control 211 would process the data associated with the contents of the electronic mail in-box that client 210 received from data server 220. In this case, the specific view class may be used to specify the layout of the data, such as the ordering of "TO" and "FROM" columns, the width of the column and what color the columns are displayed in.

As shown in FIG. 2, view descriptor 230 is sent from data server 220 to client 210. Then client 210 submits SQL query 240 to data server 220 and XML data 250 is then returned to client 210. In an alternate embodiment of the invention, view descriptor 230 may be sent simultaneously with XML data 250. In this embodiment, network bandwidth is conserved because only one network session need be established for view control 211 to receive view descriptor 230 as well as XML data 250.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A client computer in a system including a data server and the client computer that is associated with a web browser, wherein the client computer accesses data stored on the data server and displays such data using the web browser, the client computer comprising a processor for processing computer-executable instructions stored on one or more computer-readable media of the client computer and that are configured for implementing a method for transforming the accessed data into a format for viewing using the web browser, the method comprising:

an act of the client computer accessing a view descriptor, the view descriptor identifying (i) data stored at a data server in any of a plurality of formats, including one or more proprietary formats that are not natively displayable using the web browser, and (ii) one or more data transforms to be performed on the stored data for viewing with the web browser, the one or more data transforms of the view descriptor including formatting parameters on how the stored data should be styled when viewed with the web browser;

an act of the client computer processing the view descriptor using a generic style sheet, the generic style sheet containing generic information on how to display the stored data for a wide variety of different output display formats, to generate a specific style sheet tailored specifically to the stored data;

an act of the client computer accessing the stored data that was identified by the view descriptor; and an act of the client computer transforming the accessed data using the specific style sheet generated from the view descriptor and generic style sheet for viewing with the web browser.

2. The client computer as recited in claim 1, wherein the act of the client computer accessing a view descriptor comprises the following:

an act of the client computer accessing a view descriptor that includes parameters on how the identified stored data should be arranged when viewed on the web browser.

3. The client computer as recited in claim 1, wherein the act of the client computer accessing a view descriptor comprises the following:

an act of the client computer accessing a view descriptor that includes Extensible Markup Language tags.

4. The client computer as recited in claim 1, wherein the act of the client computer accessing a view descriptor comprises the following:

an act of the client computer downloading the view descriptor.

5. The client computer as recited in claim 4, wherein the act of downloading the view descriptor comprises the following:

an act of the client computer downloading the view descriptor over a dial-up connection.

6. The client computer as recited in claim 4, wherein the act of the downloading the view descriptor comprises the following:

an act of the client computer downloading the view descriptor over a permanent network connection.

7. The client computer as recited in claim 4, wherein the act of downloading the view descriptor comprises the following:

an act of the client computer downloading the view descriptor over the Internet.

8. The client computer as recited in claim 1, wherein the act of the client computer accessing a view descriptor comprises the following:

an act of the client computer accessing a locally stored view descriptor through an API to an operating system running on the client computer.

9. The client computer as recited in claim 1, wherein the view descriptor includes Extensible Style Language tags, in order to generate a specific style sheet for the stored data.

10. The client computer as recited in claim 1, wherein the act of the client computer processing the view descriptor comprises the following:
   an act of the client computer processing the view descriptor to generate a query, which may be submitted to the data server.

11. The client computer as recited in claim 10, wherein the act of the client computer processing the view descriptor to generate a query comprises the following:
   an act of the view control processing the view descriptor to generate an SQL query, which may be submitted to the data server.

12. The client computer as recited in claim 1, wherein the act of the client computer accessing the stored data comprises the following:
   an act of the client computer submitting a query to the data server.

13. The client computer as recited in claim 12, wherein the act of the client computer submitting a query to the data server comprises the following:
   an act of the client computer submitting a SQL query to the data server.

14. The client computer as recited in claim 1, wherein the act of the client computer accessing the stored data comprises the following:
   an act of the client computer downloading the stored data from the data server.

15. The client computer as recited in claim 1, wherein the act of the client computer formatting the accessed data for viewing comprises the following:
   an act of the client computer processing the specific style sheet to format the data.

16. The client computer as recited in claim 1, further comprising an act of the client computer outputting the formatted data.

17. A method as recited in claim 1, wherein the data stored at a data server and identified by the view descriptor includes contents of an email inbox.

18. A method as recited in claim 1, wherein the data stored at the data server is identified in the view descriptor as a reference to remote data stored at the data server.

19. A client computer in a system including a data server and the client computer that is associated with a web browser, wherein the client computer accesses data stored on the data server and displayed such data using the web browser, the client computer comprising a processor for processing computer-executable instructions stored on one or more computer-readable media of the client computer and that are configured for implementing a method for transforming the accessed data into a format for viewing using a web browser, the method comprising:
   an act of the client computer accessing a view descriptor, the view descriptor identifying (i) data stored at a data server in any of a plurality of formats, including one or more proprietary formats that are not natively displayable using the web browser, and (ii) one or more data transforms to be performed on the stored data for viewing with the web browser, the one or more data transforms of the view descriptor including formatting parameters on how the stored data should be arranged when viewed on the web browser;
   an act of the client computer processing the view descriptor using a generic style sheet, the generic style sheet containing generic information on how to display the stored data for a wide variety of different output display formats, to generate a specific style sheet tailored specifically to the stored data;
   an act of the client computer accessing the stored data that was identified by the view descriptor; and
   a step for the client computer converting the identified stored data using the specific style sheet generated from the view descriptor and the generic style sheet for viewing with the web browser.

20. A computer program product for use in a system including a data server and a client computer that is associated with a web browser, wherein the client computer accesses data stored on the data server and displayed such data using the web browser, the computer program product comprising one or more computer-readable media having computer-executable instructions for implementing a method for transforming the accessed data into a format for viewing using a web browser, the method comprising:
   an act of the client computer accessing a view descriptor, the view descriptor identifying (i) data stored at a data server in any of a plurality of formats, including one or more proprietary formats that are not natively displayable using the web browser, and (ii) one or more data transforms to be performed on the stored data for viewing with the web browser, the one or more data transforms of the view descriptor including formatting parameters on how the stored data should be arranged when viewed on the web browser;
   an act of the client computer processing the view descriptor using a generic style sheet, the generic style sheet containing generic information on how to display the stored data for a wide variety of different output display formats, to generate a specific style sheet tailored specifically to the stored data;
   an act of the client computer accessing the stored data that was identified by the view descriptor; and
   a step for the client computer converting the identified stored data using the specific style sheet generated from the view descriptor and the generic style sheet for viewing with the web browser.

* * * * *